(12) United States Patent  
Chan et al.

(10) Patent No.: US 9,000,894 B2
(45) Date of Patent: Apr. 7, 2015

(54) METHOD AND APPARATUS FOR IMPROVING RECEPTION OF AN RFID TAG RESPONSE

(75) Inventors: Yiu Kwong Chan, Bellport, NY (US); Aviv Shacher, Ramat-Gan (IL)

(73) Assignee: Symbol Technologies, Inc., Holtsville, NY (US)

( * ) Notice: Subject to any disclaimer, the term of this patent is extended or adjusted under 35 U.S.C. 154(b) by 207 days.

(21) Appl. No.: 13/563,010

(22) Filed: Jul. 31, 2012

(65) Prior Publication Data

US 2014/0035731 A1 Feb. 6, 2014

(51) Int. Cl.
*H04Q 5/22* (2006.01)
*G06K 7/00* (2006.01)
*G06K 7/10* (2006.01)

(52) U.S. Cl.
CPC .......... *G06K 7/0008* (2013.01); *G06K 7/10356* (2013.01)

(58) Field of Classification Search
CPC G06Q 10/087; G06K 7/10366; G06K 7/0008
USPC ........................................... 340/10.3
See application file for complete search history.

(56) References Cited

U.S. PATENT DOCUMENTS

| 8,242,909 | B2 * | 8/2012 | Bellows et al. ............ 340/572.1 |
| 8,519,848 | B2 * | 8/2013 | Stern ......................... 340/572.1 |
| 2005/0200528 | A1 | 9/2005 | Carrender et al. |
| 2007/0040687 | A1 | 2/2007 | Reynolds |
| 2007/0222608 | A1 | 9/2007 | Maniwa |
| 2009/0058657 | A1 | 3/2009 | Tuttle |
| 2009/0219141 | A1 | 9/2009 | Pillai et al. |
| 2009/0273449 | A1 | 11/2009 | Tuttle |
| 2010/0052857 | A1 | 3/2010 | Ozeki et al. |

FOREIGN PATENT DOCUMENTS

| EP | 1845631 A1 | 10/2007 |
| EP | 2202891 A1 | 6/2010 |
| WO | 2007102142 A1 | 9/2007 |

OTHER PUBLICATIONS

International Search Report and Written Opinion for International Patent Application No. PCT/US2013/048875 mailed Oct. 7, 2013.

* cited by examiner

*Primary Examiner* — Brian Zimmerman
*Assistant Examiner* — Sara Samson (57) ABSTRACT

A method and apparatus for improving reception of responsive RFID signals is provided. The method includes transmitting a plurality of interrogation signals each having a different polarization to activate one or more RFID tags. Responsive signals from the RFID tags are analyzed for receive symbol quality data to select a transmit polarization subset. These polarizations are then used for transmitting further interrogation signals to the RFID tags. The apparatus includes a dual element orthogonal radiator coupled to a transmitter and receiver. A processor controls the transmitter and receiver to transmit a series of RFID interrogation signals each having a different polarization, and receive a series of responsive signals from one or more RFID tags. The responsive signals are analyzed to select a particular a transmit polarization subset that will improve reception of future responsive signals from the RFID tags.

18 Claims, 6 Drawing Sheets

METHOD AND APPARATUS FOR IMPROVING RECEPTION OF AN RFID TAG RESPONSE

FIELD OF THE DISCLOSURE

The present disclosure relates generally to remotely identifying and locating objects, and more particularly relates to remotely identifying and locating objects using radio frequency identification (RFID) signaling.

BACKGROUND

RFID technology allows identification data to be collected remotely, which provides a significant advantage in identifying articles, parcels or other items. To access identification data stored in an RFID transponder (commonly referred to as a "RFID tag" or "tag"), an RFID reader/encoder generates an energy field via a transmission beam to interrogate the RFID tag, and subsequently, to retrieve data stored in the RFID tag. The data received from the RFID tag is processed by a computer system to identify the item that is associated with the RFID tag. Due to its convenience and reliability, RFID technology has found a wide range of applications, including item tracking, item location, inventory assessment, etc.

Figure 1:
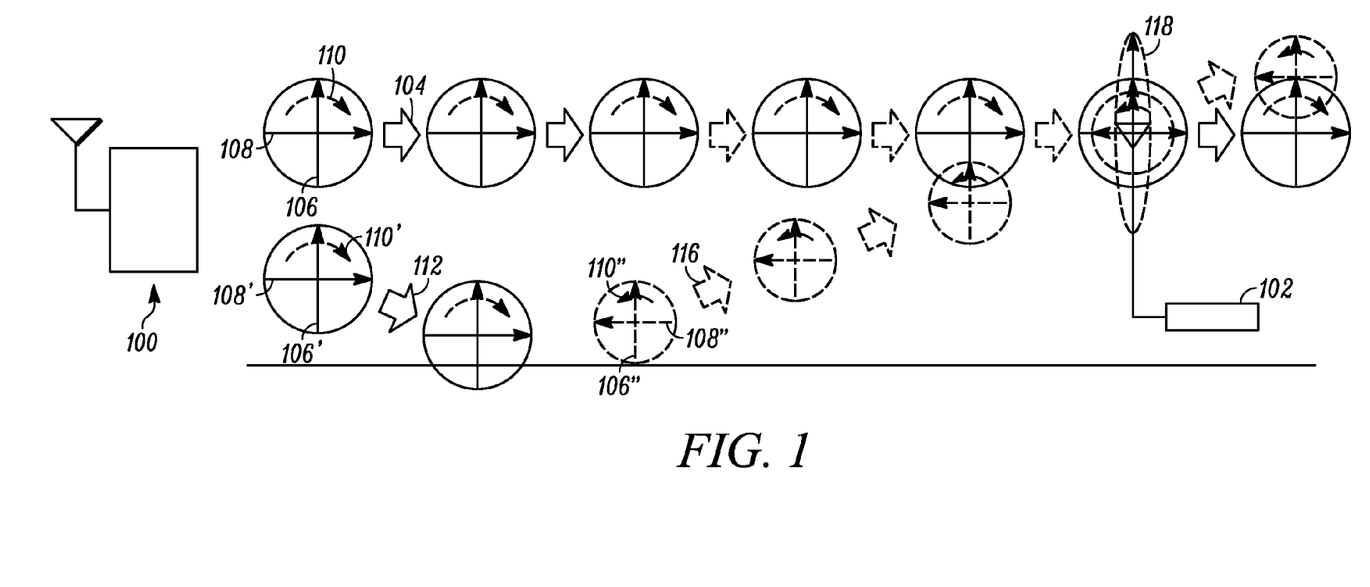
FIG. 1 is a vector time lapse diagram illustrating transmission impediments of circularly polarized waves in a reverberated environment.

However, complications may occur in the detection of RFID tags in monitored areas where reverberated space present fading and multipath affects that impede reception of responsive signals from RFID tags. In an attempt to overcome these reception challenges, conventional RFID systems utilize a circular polarized antenna. However, circular polarized antennas incur a mismatch loss of 3 dB in each transmission direction (reader-to-tag and tag-to-reader) or as much as 6 dB per transmission/reception. As a simple example, consider FIG. 1, which illustrates a RFID reader 100 transmitting an interrogation signal to an RIFD tag 102. Along a direct transmission path 104, the circular polarized interrogation signal includes a vertical component 106 and a horizontal component 108 and has a clockwise polarization (indicated by arrow 110). Due to the finite beam width of the antenna of the RFID reader 100, a divergent transmission path 112 also exists (only one divergent path illustrated for simplicity) which includes a vertical component 106' and a horizontal component 108' and has a clockwise polarization (indicated by arrow 110'). Upon contact with a reflective (conductive) surface 114, a reflective transmission path 116 is created. As can be seen in the illustration of FIG. 1, the reflected interrogation signal has a vertical component 106" and horizontal component 108" that has a reduced magnitude due to energy lost in the reflection. Also, the horizontal component 108" has incurred a phase shift of 180° resulting in the reflected interrogation signal being polarized in a counter-clockwise direction (as indicated by the arrow 110"). As this signals move toward the RFID tag 102, there is a possibility that they will collide at or near the antenna of the RFID tag 102. If this occurs, the vertical components 106, 106" will undergo constructive interference (i.e., add) and the horizontal components 108, 108" will undergo destructive interference (i.e., subtract). Such changes the polarization of the received interrogation signal 118 to be elliptically polarized possessing a particular mean polar angle (from the point of view of the RFID tag 102). This presents a mismatch that may greatly reduce the energy available to energize (or power) the RFID tag 102 to transmit a responsive signal. If the RFID tag can derive sufficient power from the RF carrier of the interrogation signal, inter-symbol interference resulting from the collision may distort the baseband component of the interrogation signal causing the RFID tag not to respond. However, it will be appreciated that if the RFID tag 102 is activated to transmit a responsive signal, similar transmission impediments occur in the responsive transmission direction.

Moreover, if items associated with RFID tags are randomly placed and oriented within the monitored area, the RFID tags (and the respective antennas) will be randomly oriented with respect to the RFID readers. Random orientation may also promote polarization errors and other deficiencies in the responsive signals returned from the RFID tags.

Accordingly, there is a need for a method and apparatus for improving reception of responsive signals from RFID tags.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the disclosure as claimed, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure.

The apparatus and method components have been represented where appropriate by conventional symbols in the drawings, showing only those specific details that are pertinent to understanding the embodiments of the disclosure so as not to obscure the disclosure with details that will be readily apparent to those of ordinary skill in the art having the benefit of the description herein.

DETAILED DESCRIPTION

Techniques are disclosed for improving reception of a responsive signal transmitted from an RFID tag. In fundamental embodiments, a plurality of interrogation signals each having a different polarization is transmitted to activate one or more RFID tags. Responsive signals from the RFID tags are analyzed for receive symbol quality data using quality parameters (e.g., bit error rate, package error rate, total data errors, RFID tag read rate or RFID tag capture rate) to select a transmit polarization subset. This transmit polarization subset is then used for transmitting further interrogation signals to the RFID tags to improve reception of the incident responsive signals from the RFID tags.

Figure 2:
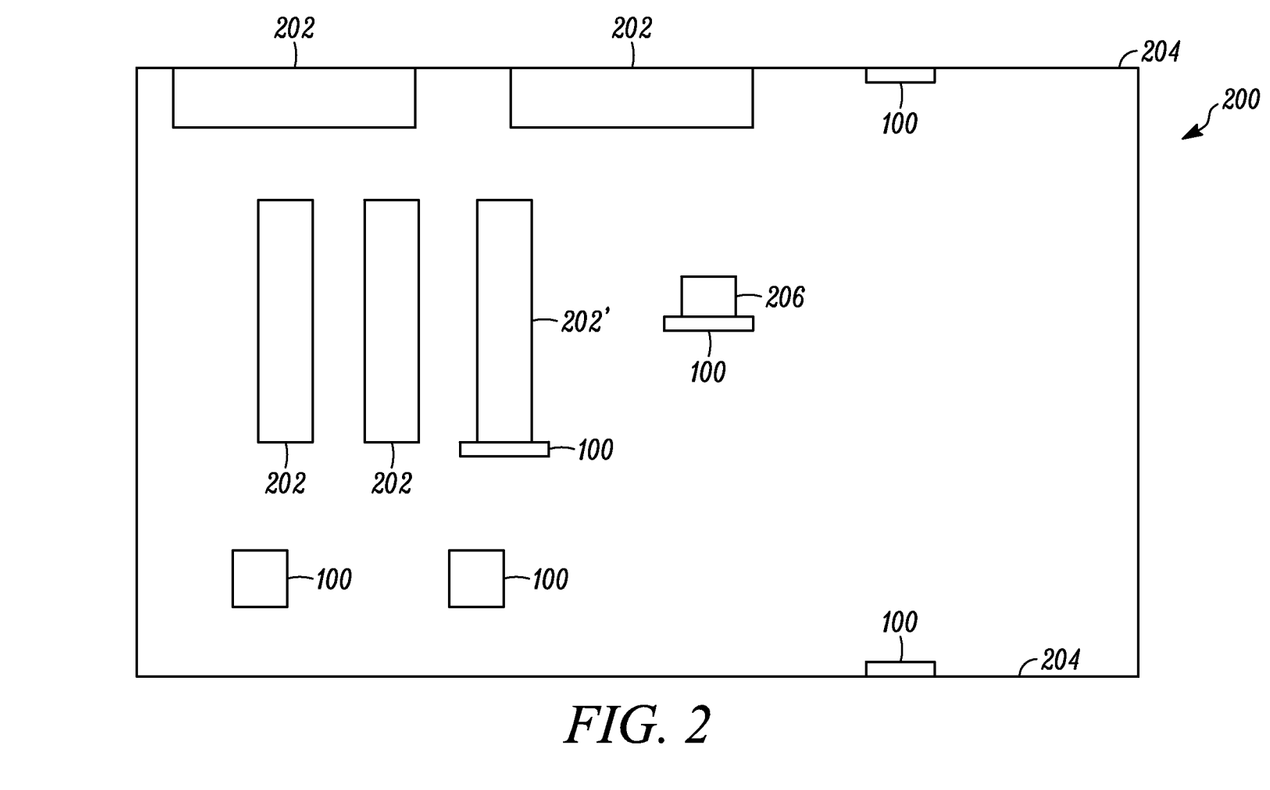
FIG. 2 is a top plan view of a monitored area in accordance with some embodiments.

Referring now to FIG. 2, a top plan view of a monitored area 200 in accordance with some embodiments is illustrated.

Within the monitored area 200, several RFID readers 100 may be positioned to provide adequate coverage to be able to interrogate RFID tags anywhere within the monitored area 200, such as, for example, on shelving 202. Generally, the RFID readers 100 may be positioned anywhere within the monitored area, including without limitation, on a shelving unit 202', on a wall 204, on a support post 206 or configured on the ceiling (which is transparent in FIG. 2) of the monitored area 200.

Figure 3:
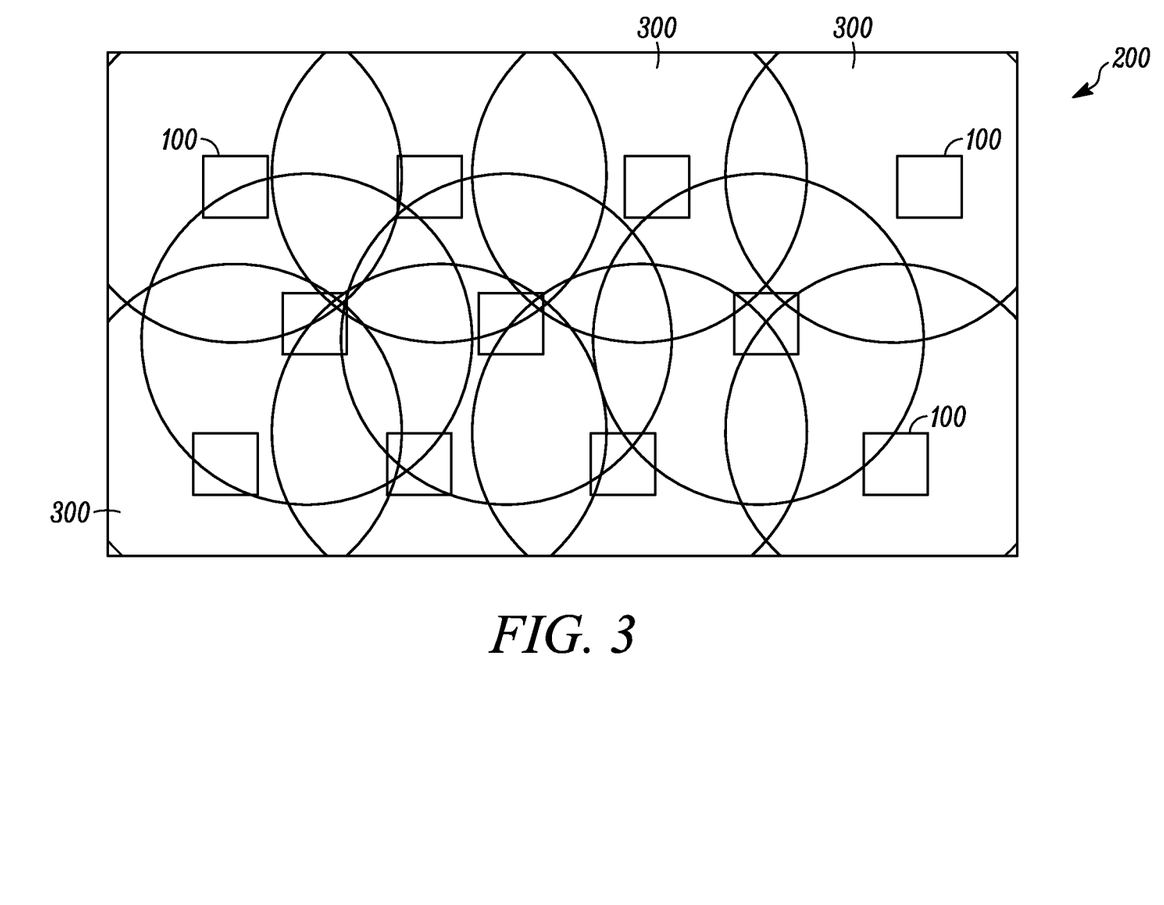
FIG. 3 is a top plan view of the monitored area of FIG. 2 illustrating the RFID coverage from a plurality of ceiling mounted RFID readers in accordance with some embodiments.

FIG. 3 is a top plan view of the monitored area 200 of FIG. 2 illustrating the RFID coverage from a plurality of ceiling mounted RFID readers 100 in accordance with some embodiments. As can be seen, each RFID reader 100 has a coverage area 300 within which an interrogation signal may be transmitted to interrogate and receive responsive signals from one or more RFID tags (not shown in FIG. 3). Typically, the coverage areas 300 overlap to some extent, which presents options for interrogating the RFID tags from one or more RFID readers 100. In this way, the overlapping RFID coverage area and adaptable antenna beams afford the RFID system of the present disclosure a more efficient and reliable opportunity to read the RFID tags within the monitored area 200.

Figure 4:
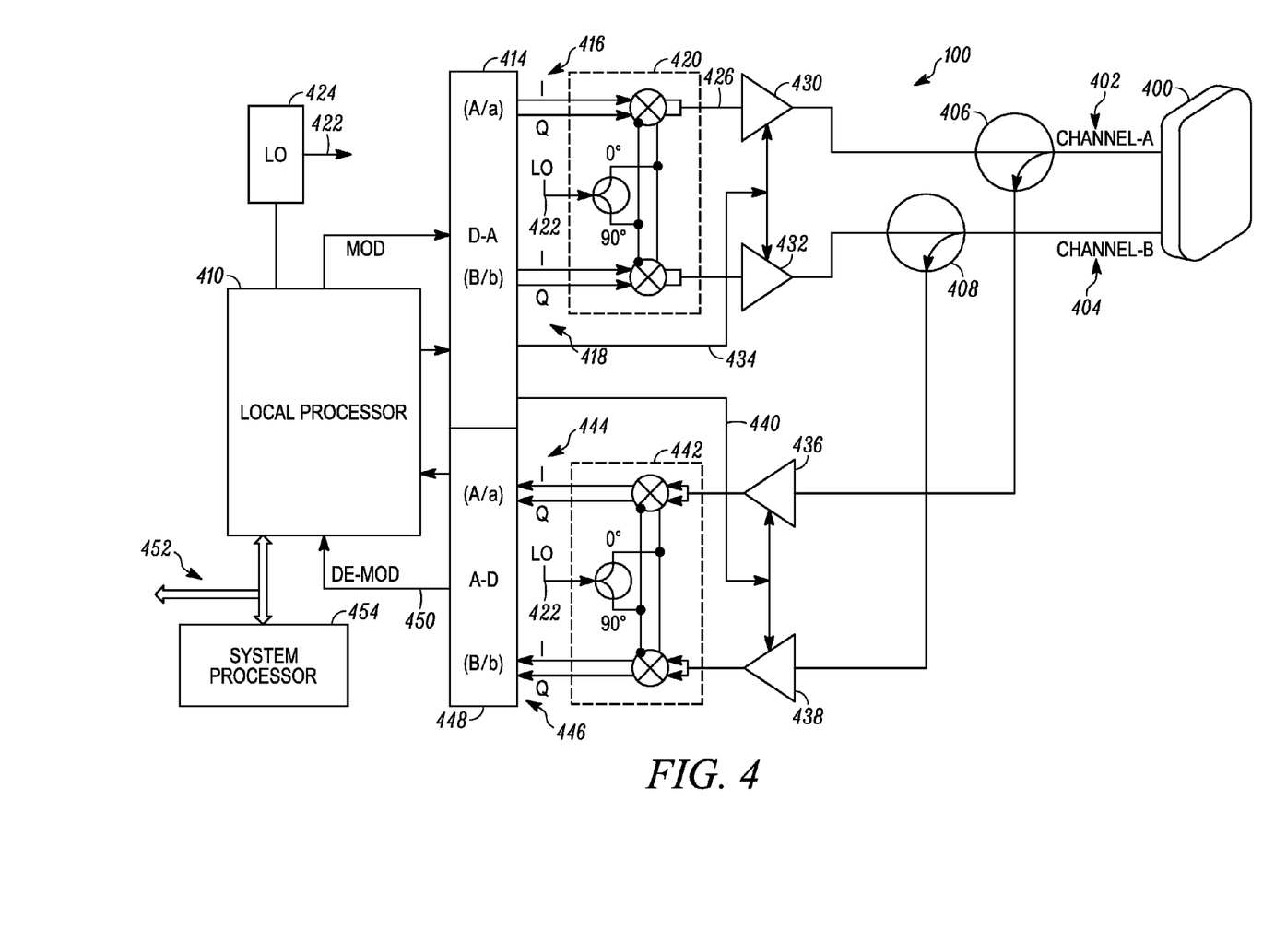
FIG. 4 is a functional block diagram of an RFID reader in accordance with some embodiments.

FIG. 4 is a functional block diagram of an RFID reader 100 in accordance with some embodiments. The RFID reader 100 includes a dual element radiator 400, which in some embodiments has orthogonally separated and isolated elements for each of a vertical element for channel A (402) and a horizontal element for channel B (404). Preferably, the dual element radiator 400 has a phase delay match between channel A and channel B of +/−2° or less, a field intensity match between the energy transmitted/received for channel A and B of +/−0.3 db or less and a relative field polar orthogonal error of +/−2° or less. In the mono-static configuration illustrated in FIG. 4, channel A (402) and channel B (404) are coupled to direction circulators 406 and 408, respectively. However, it will be appreciated that the RFID reader 100 could also be implemented in a bi-static configuration having a separate dual element radiator for the transmitter and receiver. Also, in a multiple RFID reader implementation (see, FIG. 3), each RFID reader 100 is typically coupled via an interconnecting communication bus 452 to a system processor 454, which controls operation of the overall RFID system.

According to exemplary embodiments, each RFID reader 100 transmits a plurality of interrogation signals within its coverage area (300 in FIG. 3). The plurality of interrogation signals each have a different polarization to provide a sweep through various polarizations to activate one or more RFID tags within the coverage area. Receive symbol quality data for responsive signals for each polarization of transmitted interrogation signals are analyzed using quality parameters to select or determine a transmit polarization subset. In one embodiment, this determination is made by selecting polarizations returning receive symbol quality data above a threshold. In other embodiments, this determination is made by excluding those polarizations producing responsive signals have insufficient receive symbol quality data. Future interrogation signals will be transmitted using one or more of the polarizations within the transmit polarization subset, which in turn, maximizes reception of the responsive signals of the RFID tags within the coverage area (300 in FIG. 3). In some embodiments, this polarization sweep is done periodically by time. Non-limiting examples include schedules of each hour, shift, day, week or month. In other embodiments, the polarization sweep may be done randomly or upon detection that receive signal parameters have fallen below an acceptable threshold.

In some embodiments, the polarization sweep patterns may be pre-programmed or stored in the RFID reader 100 and selected randomly or a particular order. In other embodiments, a local processor 410 selects a beginning polarization, an end polarization and a polarization step size for each sweep. Depending upon the implementation, the polarization step size may be selected for random sweeps, progressive sweeps or successive approximated sweeps as will be appreciated. Once these sweep parameters are selected, the local processor 410 sends a modulated interrogation signal of one polarization to a digital-to-analog (D/A) converter 414. The D/A 414 provides in-phase (I) and quadrature-phase (Q) components 416 for channel A having a magnitude (A) and a phase (a) and IQ components 418 having a magnitude (B) and a phase (b) for channel B to a modulator 420. The modulator 420 operates in conventional manner using a local oscillator (LO) signal 422 provided by a LO 424. The modulated output signals 426 and 428 are applied to power amplifiers 430 and 432 (respectively), which are controlled by an automatic level control (ALC) signal 434 from the D/A 414. The power amplifiers 430 and 432 are coupled to the circulators 406 and 408 (respectively) to be transmitted by the dual element radiator 400.

Thus, according to exemplary embodiments, the channel A signal (402) and the channel B signal (404) will be magnitude (A) and phase (a) manipulated to conduct a polarization sweep of interrogation signals. As used herein, polarization may mean any polarization, including, without limitation, linear, slant, ellipse or circular polarization. It will be appreciated that linear to linear polarization sweeps can be achieved via a magnitude difference in channel A (402) and channel B (404), linear to ellipse polarization sweeps can be achieved via a phase difference in channel A (402) and channel B (404) and ellipse to circular polarization sweeps can be achieved via equal magnitudes (A and B) and a +/−90° phase (a and b) in channel A (402) and channel B (404). Using these principles, any combination of polarizations may be sweep via modifying the differential magnitude (A and B) swept from 1:0>1:1>0:1 and differential phase (a and b) swept from 0° to 359°. By selection of the beginning polarization, end polarization and polarization step size, coarse (fewer steps) or fine (many steps) polarization sweeps may be conducted. Coarse sweeps typically will be competed more quickly than fine sweeps and may be used, for example, during business hours of an establishment so as not to impede use of the RIFD system to locate tags (items). Finer sweeps may be done off-hours to get a more detailed alignment of the polarization between the RFID reader and the RFID tags to promote better operation of the RFID system.

For each interrogation signal transmitted within a polarization sweep, one or more RFID tags will receive the interrogation signal and respond with a responsive signal. The responsive signals are received by the dual element radiator 400 (or a separate radiator in a bi-static configuration) and receive symbol quality parameters are analyzed for each responsive signal corresponding to each polarization of a transmitted interrogation signal. That is, exemplary embodiments of the present disclosure contemplate analyzing the received baseband information to determine symbol quality data to use for selecting a transmit polarization subset for future interrogation signals. The method of the present disclosure is superior to conventional methods that examine only the carrier component of the responsive signals since the constructive interference in a reverberated environment can produce strong received signal strength, but poor received information.

Accordingly, the circulators 406 and 408 route the received signals for channel A (402) and channel B (404) to linear amplifiers 436 and 438 (respectively), which operate under control of an automatic gain control (AGC) signal 440 provided by the D/A 414. The amplified signals are applied to a demodulator 442, which provides IQ components 444 for channel A and 446 for channel B to an analog-to-digital (A/D) converter 448. The A/D converter 448 provides a demodulated signal 450 to the local processor 410 for determination and analysis of receive symbol quality parameters for each responsive signal. Such receive symbol quality parameters include, but are not limited to, bit error rate, package error rate, total data errors, RFID tag read rate and RFID tag capture rate. In this way, a correspondence between the transmitted polarization and the responsive receive symbol quality data allows the local processor 410 to select an acceptable subset of polarizations for further (future) interrogation signals transmitted during the ordinary operation of the RFID system. Ideally, the polarizations included in the transmit polarization subset provides a linear polarized interrogation signal (from the point of view of the RFID tag), which maximizes received energy of the RFID tag. This produces a higher quality responsive signal, which in turn improves reception by the RFID reader.

Figure 5:
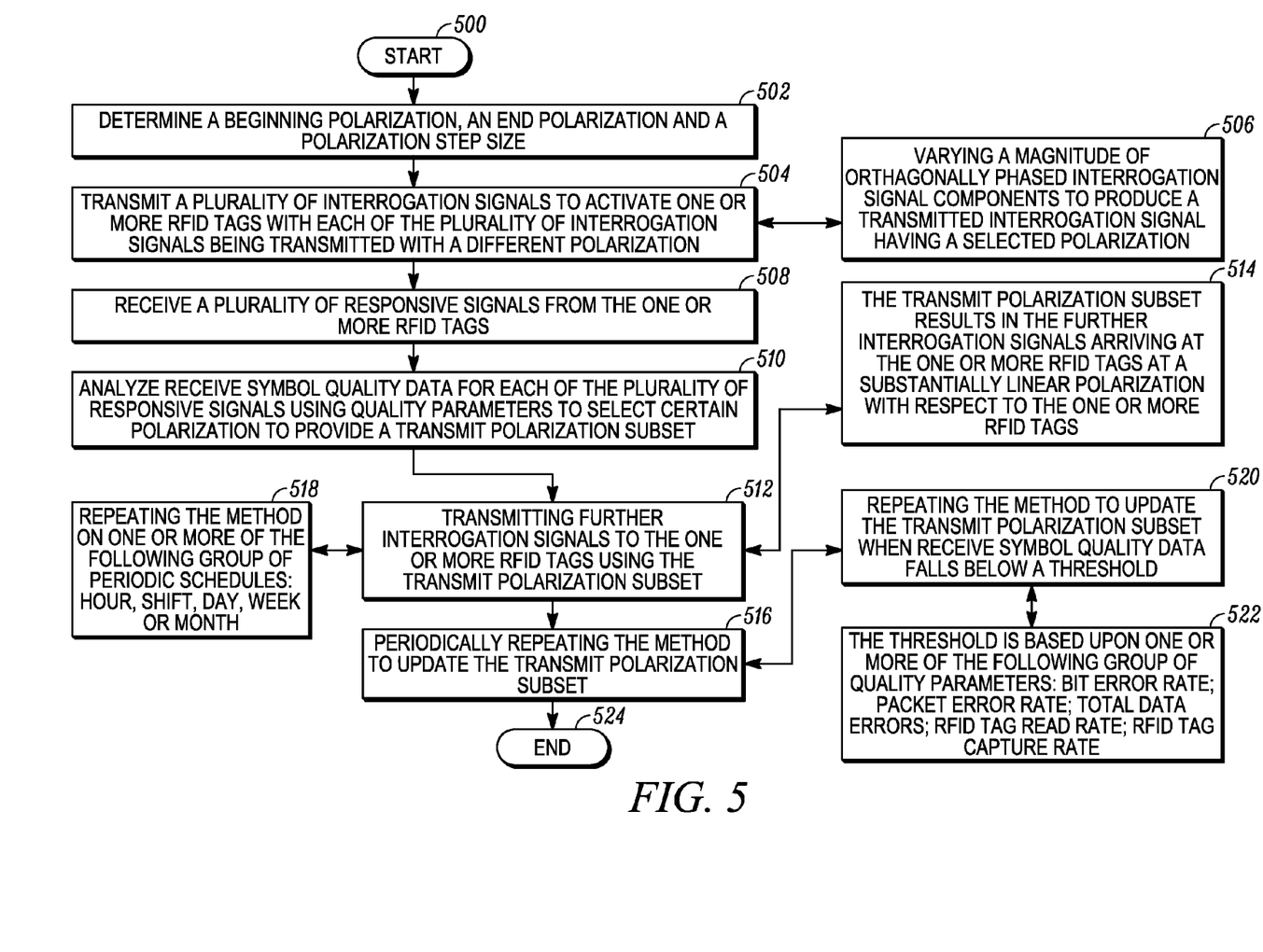
FIG. 5 is a flow diagram illustrating a method in accordance with some embodiments.
Figure 6:
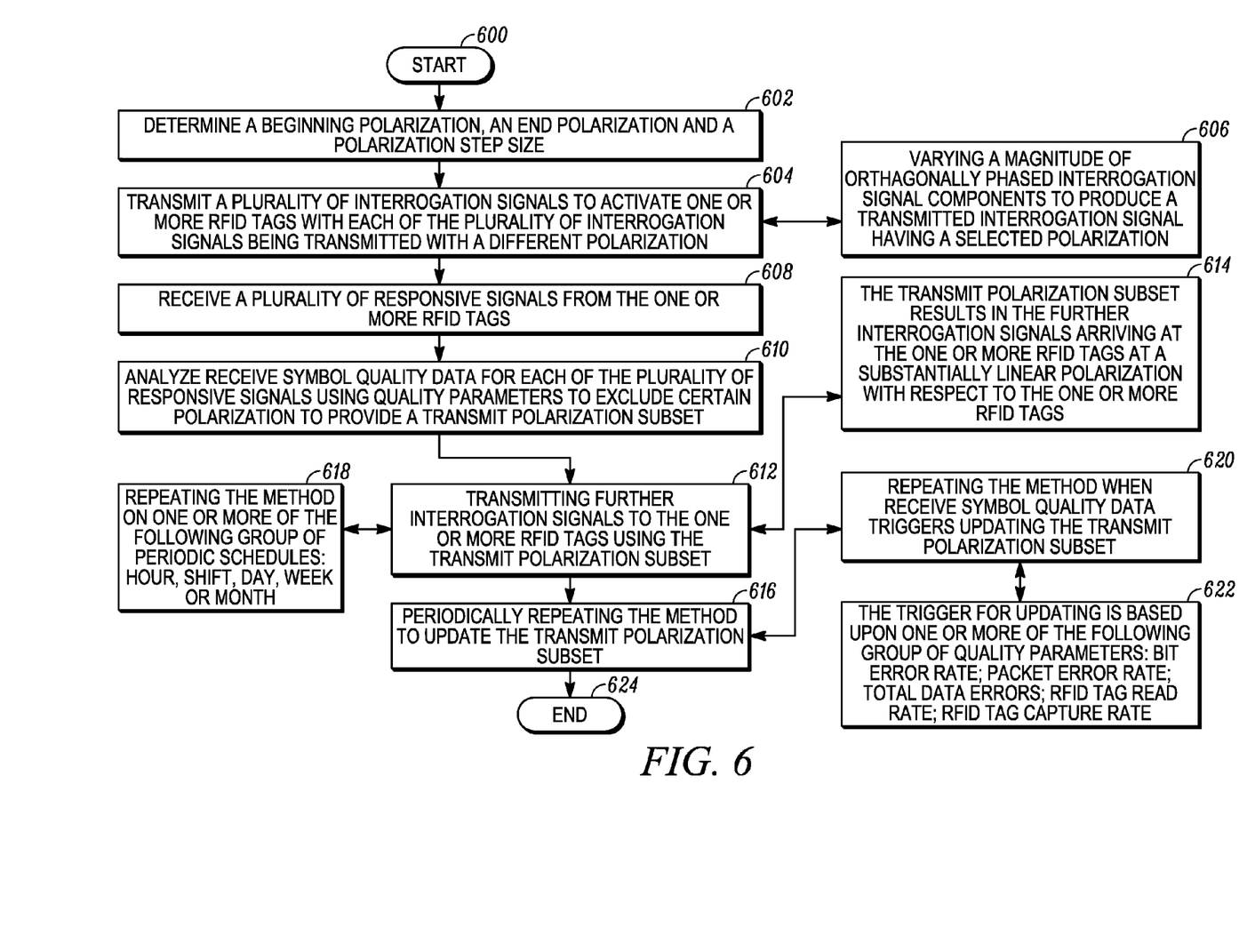
FIG. 6 is a flow diagram illustrating a method in accordance with some embodiments.

In FIGS. 5-6, flow diagrams illustrate methods for improving reception of RFID responsive signals. Essentially, these methods differ in the manner in which the transmit polarization subset is determined or provided. The various tasks performed in connection with the methods of FIGS. 5-6 may be performed by software, hardware, firmware, or any combination thereof. For illustrative purposes, the following description of the methods of FIGS. 5-6 may refer to elements mentioned above in connection with FIGS. 2-4. In practice, portions of the methods of FIGS. 5-6 may be performed by different elements of the described system. It should also be appreciated that the methods of FIGS. 5-6 may include any number of additional or alternative tasks and that the methods of FIGS. 5-6 may be incorporated into a more comprehensive procedure or process having additional functionality not described in detail herein. Moreover, one or more of the tasks shown in FIGS. 5-6 could be omitted from an embodiment of the methods of FIGS. 5-6 as long as the intended overall functionality remains intact.

Referring now to FIG. 5, the routine 500 begins in step 502, which determines a beginning polarization, an end polarization and a polarization step size. Next, step 504 transmits a plurality of interrogation signals to activate one or more RFID tags, where each of the plurality of interrogation signals are transmitted with a different polarization. In some embodiments, this is done by transmitting varying a magnitude of orthogonally phased interrogation signal components to produce a transmitted interrogation signal having a selected polarization (step 506). The RFID tags receiving the interrogation signals respond with responsive signals. Accordingly, step 508 receives a plurality of responsive signals from the one or more RFID tags. The plurality of responsive signals are analyzed in step 510, which analyzes receive symbol quality data for each of the plurality of responsive signals using quality parameters to select a transmit polarization subset. The transmit polarization subset represents those polarizations to be used for future interrogation signals that the RFID reader will transmit. Thus, step 512 transmits further interrogation signals to the one or more RFID tags using one or more of the transmit polarization subset. This results in the future interrogation signals arriving at the one or more RFID tags at a substantially linear polarization with respect to the one or more RFID tags (step 514).

The present disclosure contemplates that the transmit polarization subset be re-verified or re-checked periodically. Thus, step 516 periodically repeats the method 500 to update the transmit polarization subset. In some embodiments, the method is repeated on one or more of the following group of periodic schedules: hour, shift, day, week or month (step 518). Other embodiments operate by repeating the method to update the particular polarization when the receive symbol quality data falls below a threshold (step 520). In some cases the threshold is based upon one or more of the following group of quality parameters: bit error rate; packet error rate; total data errors; RFID tag read rate; RFID tag capture rate (step 522). Finally, after the initial determination of the transmit polarization subset, or a repeated process to update the transmit polarization subset, the routine ends in step 524.

Referring now to FIG. 6, the routine 600 begins in step 602, which determines a beginning polarization, an end polarization and a polarization step size. Next, step 604 transmits a plurality of interrogation signals to activate one or more RFID tags, where each of the plurality of interrogation signals are transmitted with a different polarization. In some embodiments, this is done by transmitting varying a magnitude of orthogonally phased interrogation signal components to produce a transmitted interrogation signal having a selected polarization (step 606). The RFID tags receiving the interrogation signals respond with responsive signals. Accordingly, step 608 receives a plurality of responsive signals from the one or more RFID tags. The plurality of responsive signals are analyzed in step 610, which analyzes receive symbol quality data for each of the plurality of responsive signals using quality parameters to exclude certain polarizations to provide a transmit polarization subset. The transmit polarization subset represents those polarizations to be used for future interrogation signals that the RFID reader will transmit. The excluded polarization won't be used to transmit further interrogation signals as they resulted in poorer quality received information from the RFID tags. Thus, step 612 transmits further interrogation signals to the one or more RFID tags using one or more of the transmit polarization subset. This results in the future interrogation signals arriving at the one or more RFID tags at a substantially linear polarization with respect to the one or more RFID tags (step 614).

The present disclosure contemplates that the transmit polarization subset be re-verified or re-checked periodically. Thus, step 616 periodically repeats the method 600 to update the transmit polarization subset. In some embodiments, the method is repeated on one or more of the following group of periodic schedules: hour, shift, day, week or month (step 618). Other embodiments operate by repeating the method when the receive symbol quality data triggers updating the transmit polarization subset (step 620). In some cases the trigger for updating is based upon one or more of the following group of quality parameters: bit error rate; packet error rate; total data errors; RFID tag read rate; RFID tag capture rate (step 622). Finally, after the initial determination of the transmit polarization subset, or a repeated process to update the transmit polarization subset, the routine ends in step 624.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
transmitting a plurality of interrogation signals to activate one or more RFID tags, each of the plurality of interrogation signals being transmitted with a different polarization, and each different polarization at a different polarization step size starting from a beginning polarization to an end polarization;
receiving a plurality of responsive signals from the one or more RFID tags;
analyzing received symbol quality data for each of the plurality of responsive signals using quality parameters to select a transmit polarization subset having received symbol quality data that is above a quality threshold;
transmitting further interrogation signals to the one or more RFID tags using the selected transmit polarization subset.

2. The method of claim 1, wherein transmitting includes transmitting the plurality of interrogation signals with a different linear slant polarizations.

3. The method of claim 1, wherein transmitting includes transmitting the plurality of interrogation signals with a different elliptic polarizations.

4. The method of claim 1, wherein transmitting includes periodically repeating the transmitting the plurality of interrogation signals using coarse or fine step sizes depending on the time of day.

5. The method of claim 1, which includes repeating the method to update the transmit polarization subset when the received symbol quality data falls below the quality threshold.

6. The method of claim 5, wherein the quality threshold is based upon one or more of the following group of quality parameters: bit error rate, packet error rate, total data errors, RFID tag read rate or RFID tag capture rate.

7. The method of claim 1, wherein transmitting the plurality of interrogation signals each having a different polarization further comprises varying at least one of a magnitude and a phase of orthogonally phased quadrature interrogation signal components to produce a transmitted interrogation signal having a selected polarization.

8. The method of claim 1, wherein the a transmit polarization subset results in the further interrogation signals arriving at the one or more RFID tags at a substantially linear polarization with respect to the one or more RFID tags.

9. A method comprising:
   transmitting a plurality of interrogation signals to activate one or more RFID tags, each of the plurality of interrogation signals being transmitted with a different polarization;
   receiving a plurality of responsive signals from the one or more RFID tags;
   analyzing received symbol quality data for each of the plurality of responsive signals using quality parameters to exclude certain polarizations to provide a selected transmit polarization subset having received symbol quality data that is above a quality threshold;
   transmitting further interrogation signals to the one or more RFID tags using the selected transmit polarization subset; and
   wherein transmitting the plurality of interrogation signals further comprises determining a beginning polarization, an end polarization and a polarization step size for transmitting a plurality of interrogation signals.

10. The method of claim 9, wherein transmitting includes transmitting the plurality of interrogation signals through a sweep of different polarizations.

11. The method of claim 9, wherein transmitting includes periodically repeating the transmitting the plurality of interrogation signals using coarse or fine step sizes depending on the time of day.

12. The method of claim 10, which includes repeating the method when the received symbol quality data falls below the quality threshold.

13. The method of claim 12, wherein the quality threshold is based upon one or more of the following group of quality parameters: bit error rate, packet error rate, total data errors, RFID tag read rate or RFID tag capture rate.

14. The method of claim 9, wherein transmitting the plurality of interrogation signals each having a different polarization further comprises varying at least one of a magnitude and a phase of orthogonally phased quadrature interrogation signal components to produce a transmitted interrogation signal having a selected polarization.

15. A system comprising:
   an antenna system having a first antenna element with a first polarization and a second antenna element having a second polarization being orthogonal to the first polarization;
   a transmitter coupled to the antenna system;
   a receiver coupled to the antenna system;
   a processor coupled to the transmitter and receiver and programmed to:
   control the transmitter to transmit a series of RFID interrogation signals to one or more RFID tags, each of the series of RFID interrogation signals having a varied transmit polarization;
   control the receiver to receive a series of responsive signals from the one or more RFID tags;
   analyze received symbol quality data for each of the series of responsive signals using quality parameters to select a transmit polarization subset having received symbol quality data that is above a quality threshold; and
   transmit further interrogation signals to the one or more RFID tags using the selected transmit polarization subset; and
   wherein the processor is further programmed to periodically re-transmit the series of RFID interrogation signals at different polarization step sizes.

16. The system of claim 15, wherein the processor is further programmed to periodically re-transmit the series of RFID interrogation signals using coarse or fine step sizes depending on the time of day.

17. The system of claim 15, wherein the processor is further programmed to analyze received symbol quality data using one or more of the following group of quality parameters for each of the series of responsive signals: bit error rate; packet error rate; total data errors; RFID tag read rate; RFID tag capture rate.

18. The system of claim 15, wherein the processor is further programmed select the transmit polarization subset such that transmission of the further interrogation signals results in the further interrogation signals arriving at the one or more RFID tags at a substantially linear polarization with respect to the one or more RFID tags.

* * * * *